Patented May 6, 1952

2,595,772

UNITED STATES PATENT OFFICE 2,595,772

METHOD OF PREPARING CATALYSTS

Russell L. Daussat and Clellie T. Steele, Baton Rouge, La., assignors to Standard Oil Development Company, a corporation of Delaware No Drawing. Application December 8, 1949, Serial No. 131,896

8 Claims. (Cl. 252—439)

The present invention relates to improvements in the preparation of metal sulfide catalysts useful for the hydrogenation and dehydrogenation of organic compounds. More particularly, the invention pertains to an improved method of preparing mixed metal sulfide catalysts containing sulfidic compounds of the metals of the left sub-group of group VI and of the iron group of the periodic system, wherein substantial savings are realized by coprecipitating the metal sulfides in a non-acidic medium.

Metal sulfide catalysts of the type mentioned above, and specifically suitable combinations of tungsten sulfides with nickel sulfide have long been known to promote hydrogenation and dehydrogenation reactions. Prior to the present invention, it has been shown that a catalyst of highest activity and overall utility may be prepared by treating an aqueous alkaline solution of a salt of a thioacid of an element of group VI, left sub-group, particularly tungsten, with an aqueous solution of a salt, particularly the nitrate or sulfate of an iron group metal, particularly nickel, in a Ni:W ratio of 2:1, or thereabout, the thioacid salt solution containing sulfide ions in an amount at least equivalent to the amount of iron group metal present, and acidifying the mixed solution to a pH of about 1–3, whereby the mixed sulfides of the group VI and iron group metal are precipitated. The proper concentration of sulfide ions is maintained by introducing $H_2S$ during the coprecipitation step. Thereafter the mixed sulfides are separated from the solution by filtering or centrifuging, dried, treated in an atmosphere of hydrogen sulfide at temperatures of about 250°–500° C. to increase the sulfur content from about 20 to 25%, obtainable by coprecipitation, to desirable values of about 25 to 30% whereupon the catalyst is pilled (see U. S. Patent No. 2,435,380).

While catalysts prepared as described above have excellent catalytic characteristics, the method heretofore used for their preparation has in practice turned out to be inefficient for various reasons. Acid solutions, even those having a pH as high as 3 or higher within the acid range still have an appreciable solvent power for the metal sulfides precipitated therein. For example, even when using precipitation temperatures as low as 20°–45° C. and adjusting to a pH of about 1–1.5 the solution after precipitation may still have a metal sulfide concentration of about 7 to 9%, which is lost to the catalyst recovery. Furthermore, liquid-solids separation by mechanical separation methods such as filtration or centrifuging when operated on a commercial scale is inherently not quantitative, leaving substantial amounts, frequently up to about 15% of the solids to be separated, in the filtrate or centrifuged brine. These losses combined may represent as much as about 15 to 25% of the theoretical catalyst yield and constitute a serious load on the economics of the process, particularly in commercial operation involving the preparation of catalyst batches of many thousand pounds. Finally, the supplemental high-temperature sulfidation of the dried catalyst, which has been indispensable in the conventional method of preparing these catalysts, is relatively costly.

The present invention overcomes these drawbacks and affords various additional advantages as will appear from the following description.

In accordance with this invention the coprecipitation of tungsten sulfide or similar group VI metal sulfides, and nickel sulfide or other iron group metal sulfides is carried out in a non-acidic and preferably weakly alkaline medium having a pH of about 8 or slightly above by adding to an aqueous ammonium thio salt solution of the group VI metal, containing sulfide ions in amounts at least equivalent to the metals to be precipitated, the iron group metal in the form of a salt the anion of which reacts with ammonium to form a salt or compound which upon heating in aqueous solution to temperatures of about 230° F. dissociates into normally gaseous constituents, whereupon the precipitate is separated from the brine by evaporation of the latter. When operating in this manner, sulfide losses by dissolution are avoided and the mechanical separation step is completely eliminated. The preferred iron group metal salt of the invention is the carbonate, although other compounds such as the oxides, hydroxides, cyanides, etc., may be used. Evaporation of the brine after precipitation is impractical in the above described conventional preparation method because unduly large amounts of ammonium nitrate and sulfate (from the acidifying medium) would be introduced into the catalyst.

In accordance with a specific embodiment of the invention, elemental sulfur in amounts sufficient to establish a sulfur content of about 22 to 30% desirable for the final catalyst, is added during the coprecipitation stage at any time prior to completing the evaporation of the brine. This elemental sulfur may be added to the solutions used to prepare the ammonium thio salt, and is preferably added to the ammonium sulfide solution. If desired, sulfur may also be added to the solution of the thio salt, to the iron group salt, to the mixture of these solutions, or during evaporation. Assuming the presence of slightly more than equivalent proportions of sulfide ions prior to the addition of elemental sulfur, an amount of up to about 100% of the total sulfur requirement for the formation of tungsten and nickel sulfides may be added in the form of elemental sulfur. The sulfur so added enters the precipitate to form metal sulfides and/or polysulfides of the finally desired sulfur content. The conventional supplemental high temperature sulfidation of the dried catalyst may therefore be considerably less intensive or even completely eliminated.

It has also been found that a desirable sulfur content in the final catalyst may be readily established by increasing the proportion of iron group metal salt during the coprecipitation stage of the invention substantially above 2 mols of iron group metal per 1 mol of group VI element. For example, experiments have demonstrated that coprecipitation in accordance with the invention of say 5 to 20 or more mols of nickel sulfide with 1 mole of tungsten sulfide yields a final catalyst containing about 25 to 35% sulfur, without supplemental high temperature sulfidation, as compared to only about 15 to 25% of sulfur in conventional operation. The higher sulfur content of the catalysts richer in iron group metal may be due to the fact that iron group metals are more readily sulfided than the group VI elements of the type here involved.

For a fuller understanding of the invention various embodiments thereof will be described below in greater detail by specific numerical examples using tungsten as the group VI element and nickel as the iron group metal. It is noted, however, that other elements of the left subgroup of group VI, particularly molybdenum and heavier members of this group as well as iron and cobalt may be employed.

EXAMPLE I

A batch of 150 grams of tungstic oxide was dissolved in one liter of strong ammonium sulfide solution analyzing about 8-10% of $NH_3$ and about 7-9% of $H_2S$, at about 130° F. Hydrogen sulfide was then passed into the solution until its $H_2S$ content had reached about 10-12%. Thereafter 195 grams of commercial nickel carbonate were added to the solution while stirring at 80-130° F. and a pH of about 8-10. The resulting slurry was evaporated to dryness in an atmosphere of refinery inert gas containing about 80-85% $N_2$ and 15-20% of $CO_2$ at a temperature of about 250 to 300° F. The dry material was further sulfided by heating in hydrogen sulfide for 8 hours at 800° F. The sulfide product was pilled. The catalyst yield amounted to about 95% of the theoretical.

Catalysts prepared in this manner have after drying and prior to high temperature sulfidation a composition about as follows.

| | Parts by weight |
|---|---|
| W | 30–35 |
| Ni | 18–23 |
| S | 15–18 |
| $O_2$ | 10–20 |

After high temperature sulfidation the composition may be about as follows.

| | Parts by weight |
|---|---|
| W | 32–37 |
| Ni | 21–25 |
| S | 23–38 |
| $O_2$ | 5–10 |

The catalyst prepared in accordance with Example I was tested in the hydrogenation of diisobutylene as follows. Diisobutylene (bromine number 141) containing about 20% of its weight of catalyst (i. e. 100 grams diisobutylene, 20 grams catalyst) were placed in an autoclave of about 4 liters capacity under a hydrogen pressure of about 500 p. s. i. g. at a temperature of about 450° F. for about 12 hours. The hydrogenated product had a bromine number of 34. In another run under the same conditions except that the pressure was raised to about 2700 p. s. i. g. the product had a bromine number of about 1 which indicates substantially complete hydrogenation. These results are about the same as those obtainable with the best catalyst prepared by prior art procedures.

As pointed out above, increased amounts of sulfur may be introduced into the catalyst during the coprecipitation stage by merely increasing the ratio of nickel to tungsten. For example, sulfur contents exceeding substantially 22% may be obtained by liquid phase sulfidation alone without any supplemental high temperature sulfidation of dry catalyst, when the Ni/W ratio in the precipitation stage is adjusted to a value of about 5:1, or higher. The preparation of catalysts of this type is described in the next example.

EXAMPLE II

Hydrogen sulfide was passed into 4½ liters of an aqueous $NH_3$ solution of 10% strength until the solution was saturated with $H_2S$. Then 148 grams of tungstic acid were dissolved in the ammonium sulfide solution formed. Then about 1520 grams of commercial nickel carbonate were added with stirring and about 50 grams of additional $H_2S$ was introduced, at a temperature of 100–130° F. and a pH of about 8–10. The slurry formed was evaporated to dryness in an atmosphere of nitrogen at a temperature of 130° C. to yield about 95% of the theoretical. The catalyst so prepared had a composition as follows.

| | Percent by weight |
|---|---|
| W | 7.8 |
| Ni:W | 20.6 |
| Ni | 51.5 |
| S | 28.9 |
| $O_2$ | 11.8 |

It will be observed that the sulfur content of this catalyst is well within the range of the high-temperature sulfided catalysts of Example I.

It will be noted that the sulfur content of this catalyst was substantially higher than that of the catalyst of Example I prior to high temperature sulfidation and almost as high as that of the completely sulfided catalyst of Example I.

By decreasing the ratio of Ni/W during precipitation lower sulfur contents are produced. For example, at a Ni/W ratio of about 5/1 under other equal conditions of catalyst preparation, i. e., without high temperature sulfidation a catalyst was obtained analyzing as follows.

| | Percent by weight |
|---|---|
| W | 21.6 |
| Ni:W | 5 |
| Ni | 34.5 |
| S | 24.8 |
| $O_2$ | 19.1 |

The catalysts described in Example II were tested in the hydrogenation of iso-octyl aldehyde obtained by the oxo-synthesis and were found to be of satisfactory activity.

It has been noted above that the sulfur concentration of the catalysts of the present invention may be substantially increased to reach values desirable for the finished catalyst even without high-temperature sulfidation and practically at all catalytically effective Ni/W ratios, when elemental sulfur is added during the liquid sulfiding stage of the process and more particularly to the ammonium sulfide solution used. In all other respects the process may be the same as that outlined in Examples I and II. This embodiment of the invention is illustrated by the next example.

EXAMPLE III

Some 500 cc. of ammonia water of about 12% strength (spec. grav. at 90° F.=0.954) were placed in a 1 liter Erlenmeyer flask and saturated with $H_2S$. An amount of 46.8 grams of tungstic acid was dissolved in the ammonium sulfide solution formed and the introduction of $H_2S$ was continued until the solution had a specific gravity of 1.115 at 95° F. Then 50.5 grams of nickel carbonate were added at 95° F. and a pH of about 8–10 and the slurry formed was evaporated over night in a stream of nitrogen at 120° C. The product was dried in nitrogen at 120° C. and then heated in an atmosphere of inert gas at 850° F. for four hours. About 95% of the theoretical were recovered. The process was repeated several times and the catalysts so formed had without exception a sulfur content of about 15–16%.

A catalyst was prepared exactly as described above in this example with the only exception that 30 grams of elemental sulfur were dissolved in the ammonium sulfide solution before the addition of the tungstic acid. Two catalysts prepared in this manner had sulfur contents of 26.5 and 28.2%, respectively.

Another catalyst was prepared in accordance with the procedure first described in this example, i. e., without an addition of elemental sulfur. However, the Ni/W ratio in the liquid sulfidation stage was raised from about 2/1 to about 3/1. The result was an increase in the sulfur content of the finished catalyst to 21.7%. When in the course of the same procedure about 30 grams of elemental sulfur were added to the ammonium sulfide solution the final catalyst had a sulfur content of 34.3% without high temperature sulfidation.

EXAMPLE IV

A catalyst prepared in accordance with Example II, containing about 28% S and a catalyst A prepared as described below and also containing about 28% sulfur were both tested in the hydrogenation of synthetic iso-octyl aldehyde at the conditions and with the results tabulated below.

Preparation of catalyst A 148 grams of $H_2WO_4$ and 1520 grams of $NiCO_3$ were slurried in water and digested for several hours at about 200° F. The slurry was then evaporated to dryness and thereafter sulfided by heating in $H_2S$ for 8 hours at 800° F. The sulfiding step was highly exothermic and much difficulty due to fusion was encountered.

TEST CONDITIONS AND RESULTS

|  | Catalyst A | Catalyst Example II |
|---|---|---|
| Temperature, °F | 425 | 425 |
| Pressure, p. s. i. g | 3,000 | 3,000 |
| Liquid Feed Rate, v./v./Hour | 1 | 1 |
| Catalyst Age, Hours | 490 | 600 |
| Carbonyl No. of Charge | 200–250 | 200–250 |
| Carbonyl No. of Product | 13 | 18–24 |

It will be seen that the catalyst prepared by the much less complicated procedure of Example II was only slightly less active than the high-temperature sulfided catalyst A, in spite of the higher age of the former catalyst. In addition, it is noted that the strongly exothermic character of the high-temperature sulfidation, which may be eliminated in accordance with Example II, frequently causes considerable difficulties due to fusion of solids.

In further illustration of the advantages of the present invention the preparation of similar catalysts by the conventional procedure is described below.

EXAMPLE V

Hydrogen sulfide was passed into an aqueous $NH_3$ solution of 11% strength until the $H_2S$ content was 6–7%. In the $(NH_4)_2S$ solution formed 525 lbs. of tungstic oxide were dissolved in 722 gallons of this solution under agitation and warming to 140°–145° F. Then further $H_2S$ was introduced until the $H_2S$ concentration was 9.5–11.5%. Some 1197 lbs. of $NiSO_4 \cdot 6H_2O$ were dissolved in water to give 240 gallons of solution which was added under stirring to the previously prepared solution of $(NH_4)_2WS_4$ at 70–120° F. The slurry formed was acidified to a pH of 1.2–2.1 by the addition of $H_2SO_4$ of 33% strength and thereafter centrifuged to separate the wet metal sulfides. The centrifuge cake was reslurried with 200–300 gallons of water and centrifuged again. The second centrifuge cake was reslurried in water to a solids concentration of about 20–30% and dried on a steam-heated rotary drum drier. The drum dried powder was heated in a reducing furnace in an atmosphere of $H_2S$ at a maximum temperature of 830° F. for 6–10 hours. The product was finally pilled. About 80% of the theoretical was recovered.

Catalysts so prepared had a sulfur content of about 20 to 25% prior to high-temperature sulfidation and of about 25 to 35% after such treatment. Their activity when tested in the hydrogenation of diisobutylene was about the same as that of the catalyst of Example I.

It will be observed, that the conventional procedure of Example V involved a catalyst loss of about 20% and yields catalysts which require supplemental high temperature sulfidation to reach desirable sulfur concentrations.

All catalysts prepared as described in the above examples, particularly those of relatively low sulfur content, may be further modified by the addition of about 1–5 weight per cent of elemental sulfur to the final catalyst prior to pilling.

The above description and exemplary operations have served to illustrate specific embodiments of the invention but are not intended to be limiting in scope.

What is claimed is:

1. In the process for preparing a catalyst of mixed sulfides of an element of the left subgroup of group VI of the periodic system and of a metal of the iron group by treating an aqueous solution of a salt of a thioacid of said element with a salt of said metal so as to precipitate the sulfides of said element and of said metal followed by a separation of the precipitate, wherein the said thioacid salt solution contains sulfide ions in an amount at least equivalent to said metal, the improvement which comprises adding as said metal salt a salt the anion of which forms with the cation of said thioacid salt a compound which decomposes completely into volatile constituents upon heating in aqueous solution to temperatures in excess of about 100° C., maintaining said aqueous solution non-acidic during said addition, heating said solution above 100° C. to evaporate therefrom all constituents except said precipitate and recovering said precipitate as product catalyst.

2. The process of claim 1 in which said anion is $CO_3$ and said cation is $NH_4$.

3. The process of claim 1 in which said reaction is weakly alkaline.

4. In the process for preparing a catalyst of mixed sulfides of an element of the left subgroup of group VI of the periodic system and of a metal of the iron group by treating an aqueous solution of a salt of a thioacid of said element with a salt of said metal so as to precipitate the sulfides of said element and of said metal, the ratio of said metal to said element being greater than 2:1 by weight during said precipitation, followed by a separation of the precipitate, wherein the said thioacid salt solution contains sulfide ions in an amount at least equivalent to said metal, the improvement which comprises adding as said metal salt a salt the anion of which forms with the cation of said thioacid salt a compound which decomposes completely into volatile constituents upon heating in aqueous solution to temperatures in excess of about 100° C., maintaining said aqueous solution non-acidic during said addition, heating said solution above 100° C. to evaporate therefrom all constituents except said precipitate and recovering said precipitate as product catalyst.

5. The process of claim 4 in which elemental sulfur is added to said aqueous solution prior to the recovery of the product catalyst therefrom by evaporation.

6. The process of claim 4, in which said ratio is about 5–20:1.

7. The process of claim 1 in which said element is tungsten.

8. The process of claim 1 in which said metal is nickel.

RUSSELL L. DAUSSAT.
CLELLIE T. STEELE.

REFERENCES CITED

The following references are of record in the file of this patent:

UNITED STATES PATENTS

| Number | Name | Date |
| --- | --- | --- |
| 2,159,511 | Pier et al. | May 23, 1939 |
| 2,227,672 | Pier et al. | Jan. 7, 1941 |